(12) United States Patent
Ichihashi

(10) Patent No.: US 9,982,665 B2
(45) Date of Patent: May 29, 2018

(54) AIR COMPRESSOR WITH IMPROVED COOLING PERFORMANCE

(71) Applicant: HITACHI KOKI CO., LTD., Tokyo (JP)

(72) Inventor: Naoto Ichihashi, Ibaraki (JP)

(73) Assignee: HITACHI KOKI CO., LTD., Tokyo (JP)

(*) Notice: Subject to any disclaimer, the term of this patent is extended or adjusted under 35 U.S.C. 154(b) by 828 days.

(21) Appl. No.: 14/461,412

(22) Filed: Aug. 17, 2014

(65) Prior Publication Data
US 2015/0078935 A1 Mar. 19, 2015

(30) Foreign Application Priority Data
Sep. 18, 2013 (JP) ................... 2013-193502

(51) Int. Cl.
| | | |
|---|---|---|
| F01D 5/14 | (2006.01) | |
| F04B 39/06 | (2006.01) | |
| F04B 27/02 | (2006.01) | |
| F04B 35/06 | (2006.01) | |

(Continued)

(52) U.S. Cl.
CPC ............ F04B 39/066 (2013.01); F04B 27/02 (2013.01); F04B 35/06 (2013.01); F04B 41/02 (2013.01);

(Continued)

(58) Field of Classification Search
CPC ........ F04B 39/066; F04B 35/06; F04B 41/02; F04B 27/02; F04D 25/082; F04D 29/329;

(Continued)

(56) References Cited

U.S. PATENT DOCUMENTS 2,262,695 A * 11/1941 Moeller ................ F04D 25/082
310/60 R
3,839,946 A * 10/1974 Paget ...................... F04B 27/04
417/DIG. 1

(Continued)

FOREIGN PATENT DOCUMENTS

| JP | 2004-183498 A | 7/2004 |
| JP | 2006-274889 A | 10/2006 |

(Continued)

OTHER PUBLICATIONS

Machine Translation of CN1835347, Sep. 20, 2006.*

(Continued)

Primary Examiner — Charles Freay
(74) Attorney, Agent, or Firm — Kenealy Vaidya LLP

(57) ABSTRACT

In an air compressor, inner blades of a cooling fan are formed into a centrifugal type, and outer blades are formed into an axial flow type. Exterior air is sucked through a ventilating window by the outer blades, and an air stream (CA1) is generated. A part of the generated air stream flows towards a stator coil, like an air stream (CA2). By a negative pressure generated by the inner blades, the air in the vicinity of the stator coil is sucked to the inner blades, like an air stream (CA3). The sucked air flows out from a motor-side opening towards a non-motor-side opening by a negative pressure generated by the outer blades, is sucked to the outer blades like an air stream (CA4) and flows out together with the air stream (CA1).

12 Claims, 14 Drawing Sheets

(51) Int. Cl.
  *F04B 41/02* (2006.01)
  *F04D 25/16* (2006.01)
  *F04D 29/32* (2006.01)
  *H02K 9/06* (2006.01)
  *H02K 9/14* (2006.01)
  *F04D 25/08* (2006.01)

(52) U.S. Cl.
  CPC ......... *F04D 25/082* (2013.01); *F04D 25/166* (2013.01); *F04D 29/326* (2013.01); *F04D 29/329* (2013.01); *H02K 9/06* (2013.01); *H02K 9/14* (2013.01)

(58) Field of Classification Search
  CPC .... F04D 25/166; F04D 29/326; F04D 39/281; H02K 9/14; H02K 9/06
  USPC ....................................................... 416/178
  See application file for complete search history.

(56) References Cited

U.S. PATENT DOCUMENTS

| | | | | |
|---|---|---|---|---|
| 9,447,725 | B2* | 9/2016 | Okada | .................... F04B 35/06 |
| 2004/0223845 | A1* | 11/2004 | Caplan | .................... F01D 5/34 |
| | | | | 415/173.1 |
| 2006/0204371 | A1* | 9/2006 | Rexhauser | ............ F04D 19/022 |
| | | | | 417/243 |
| 2008/0112823 | A1 | 5/2008 | Yoshida et al. | |
| 2009/0194177 | A1 | 8/2009 | Yokota et al. | |
| 2009/0196744 | A1* | 8/2009 | Yu | ....................... F04D 25/0613 |
| | | | | 415/177 |
| 2013/0042605 | A1 | 2/2013 | Kitagawa et al. | |

FOREIGN PATENT DOCUMENTS

| | | |
|---|---|---|
| JP | 2007-177722 A | 7/2007 |
| JP | 2009-185648 A | 8/2009 |
| JP | 2013-40586 A | 2/2013 |
| WO | 2013/042318 A1 | 3/2013 |

OTHER PUBLICATIONS

Japanese Office Action for the related Japanese Patent Application No. 2013-193502 dated Sep. 26, 2016.
The extended European Search Report for the related European Patent Application No. 14181250.3 dated Mar. 10, 2015.
Chinese Office Action for the related Chinese Patent Application No. 201410421341.6 dated Sep. 1, 2017.

* cited by examiner

AIR COMPRESSOR WITH IMPROVED COOLING PERFORMANCE

CROSS-REFERENCE TO RELATED APPLICATIONS

This application claims priority from Japanese Patent Application No. 2013-193502 filed on Sep. 18, 2013, the entire subject-matter of which is incorporated herein by reference.

TECHNICAL FIELD

The present invention relates to an air compressor suitable for generation of compressed air required to drive a pneumatic tool such as a nailing machine.

BACKGROUND

In a building site and the like, a portable pneumatic tool to drive a nail and a screw into a wooden material by a pressure of compressed air has been widely used. In general, an air compressor for driving the pneumatic tool and the like is configured to convert a rotational motion of a rotational shaft of a driving part such as a motor into a reciprocal motion of a piston in a cylinder through a crankshaft of a compression part and to compress air sucked from a suction valve of the cylinder by the reciprocal motion of the piston. The compressed air compressed in the cylinder is discharged from an exhaust valve of the cylinder to an air tank through a pipe and is stored in the air tank. When compressing the gas to a high pressure, a multistage reciprocating compressor of increasing a pressure in a stepwise manner has been generally used. The high-pressure compressed air stored in the air tank is adjusted to an appropriate pressure by a decompression valve attached to the air tank and is then supplied to the pneumatic tool and the like through an air hose. The air compressor is disclosed in JP-A-2013-40586.

SUMMARY

In the air compressor, typically, a rotational shaft of the motor is provided with a cooling fan so as to cool the motor, the compression part and the other heat generation parts. However, an air stream generated by the cooling fan has a high centrifugal force and is thus likely to flow in an outer peripheral direction. Therefore, it is difficult to promote the air stream in the motor, and thus the heat is likely to be accumulated in the motor.

Therefore, illustrative aspects of the present invention provide an air compressor capable of improving cooling performance of a motor.

According to one illustrative aspect of the present invention, there is provided an air compressor comprising: an air tank configured to store therein compressed air; a compression part configured to compress air sucked from an outside and to supply the air to the air tank; a motor configured to drive the compression part; a cooling fan provided at one end-side of a rotational shaft of the motor and in the vicinity of the motor; and a cover configured to cover at least the compression part and the motor, wherein the cooling fan comprises: an outer blade configured to supply an air stream to the compression part; an inner blade configured to enable an air stream to flow in a direction along a rotational shaft of the cooling fan at an inner side of the outer blade; and a partition part interposed between the outer blade and the inner blade.

Incidentally, any combination of the above-described elements, and a method, a system and the like converted from the expressions of the present invention are also effective as the aspects of the present invention.

According to the illustrative aspects of the present invention, it is possible to provide an air compressor capable of improving cooling performance of a motor.

DETAILED DESCRIPTION

Figure 1:
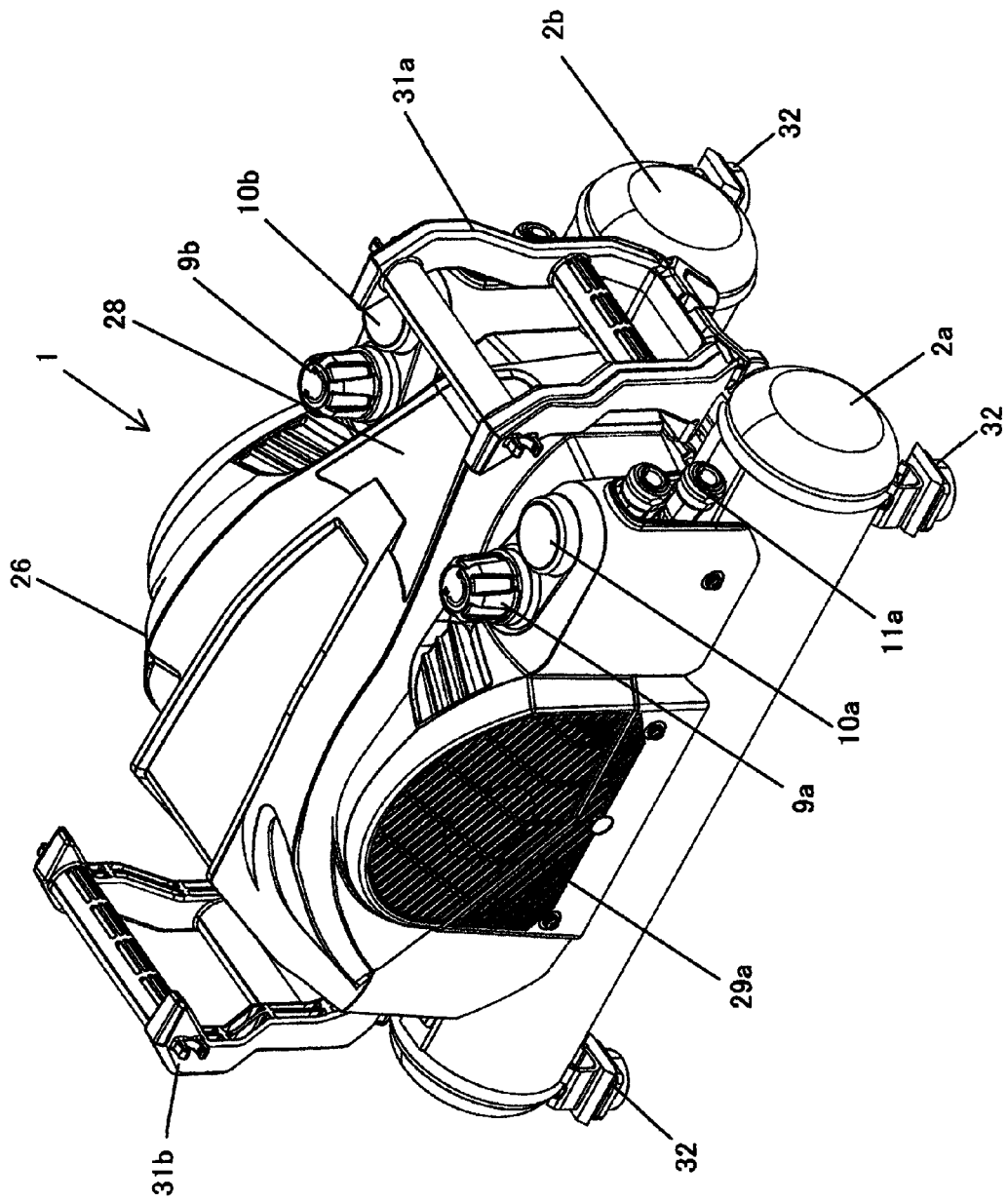
FIG. 1 is a perspective view of an air compressor 1 according to a first illustrative embodiment of the present invention.

Hereinafter, preferred illustrative embodiments of the present invention will be described with reference to the drawings. Incidentally, the same or equivalent elements, members and the like shown in the respective drawings are denoted with the same reference numerals and the overlapping descriptions are appropriately omitted. Also, the illustrative embodiments are just exemplary, not to limit the present invention, and all features and combinations thereof described in the illustrative embodiments cannot be considered as the essentials of the present invention.

First Illustrative Embodiment

Figure 2:
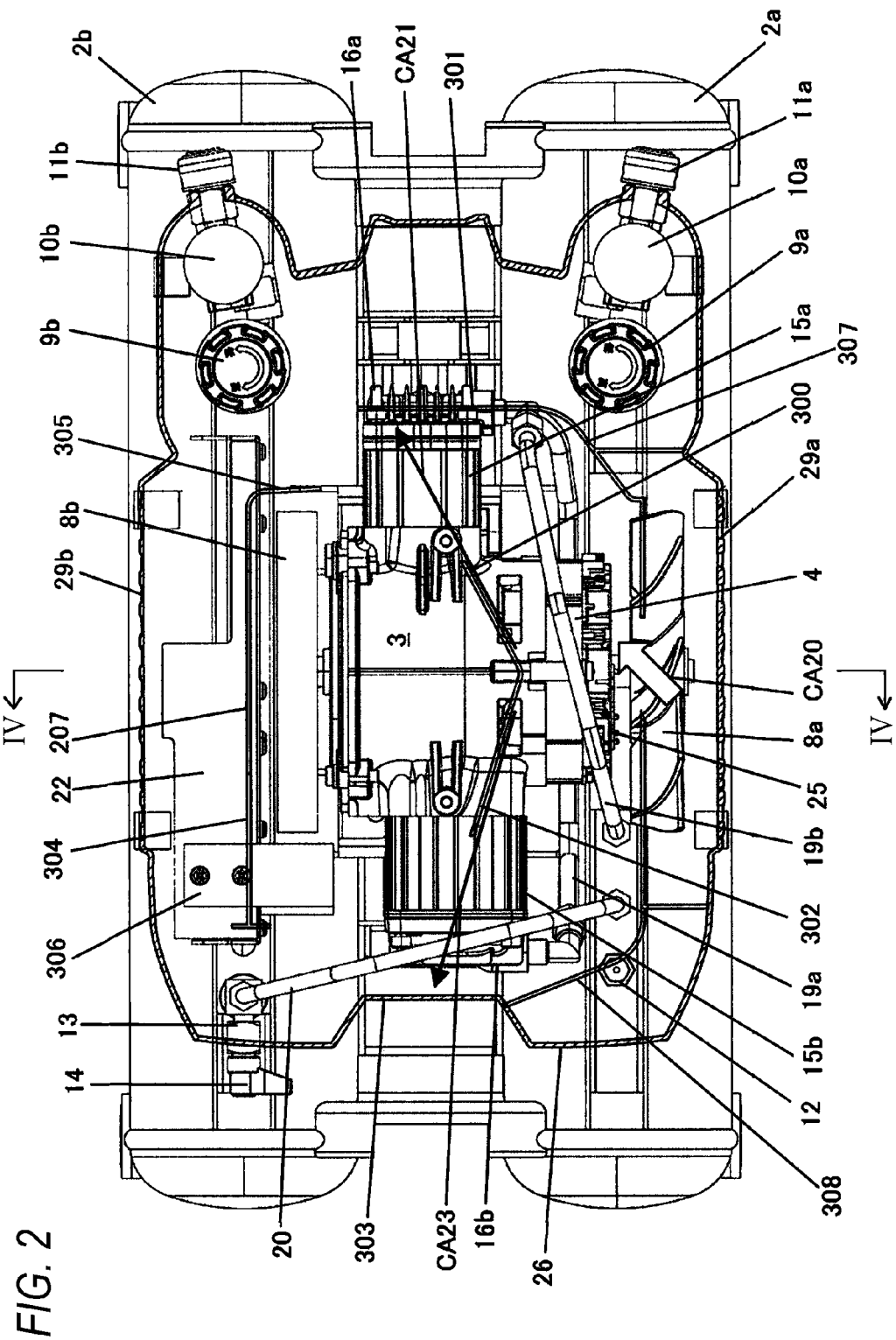
FIG. 2 is a plan view of the air compressor 1 in which a cover 26 is a cross-sectional surface.
Figure 3:
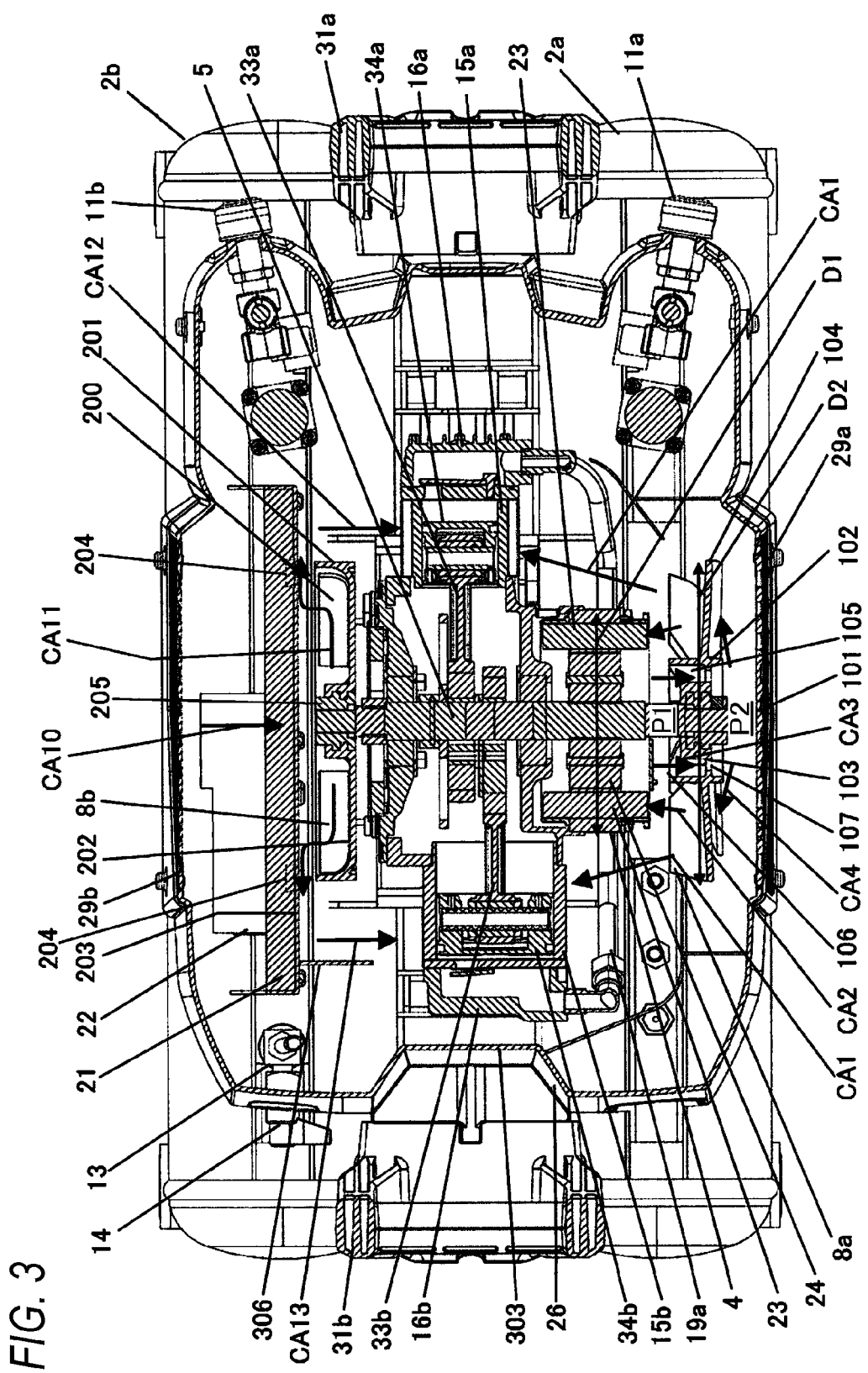
FIG. 3 is a plan sectional view of the air compressor 1.
Figure 4:
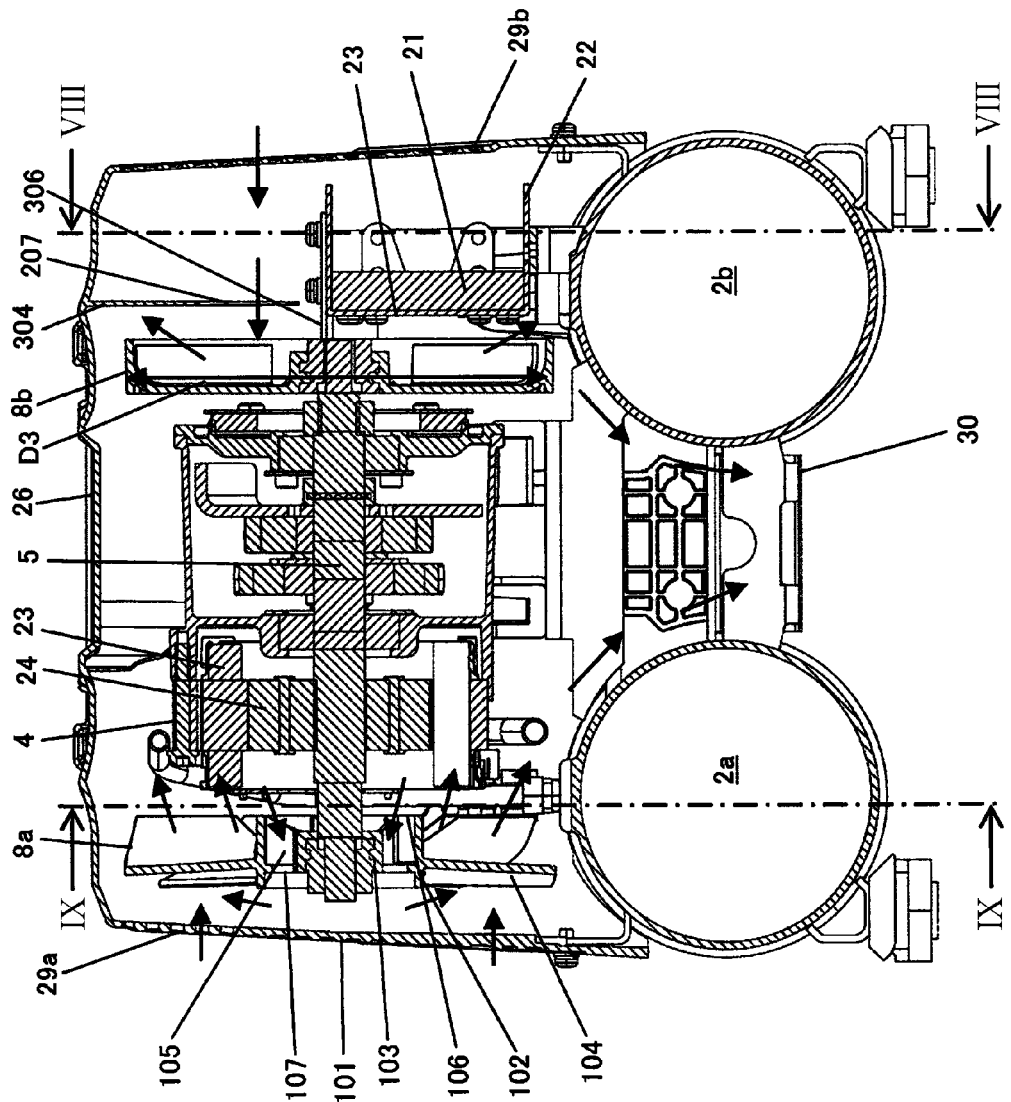
FIG. 4 is a IV-IV sectional view of FIG. 2.
Figure 5:
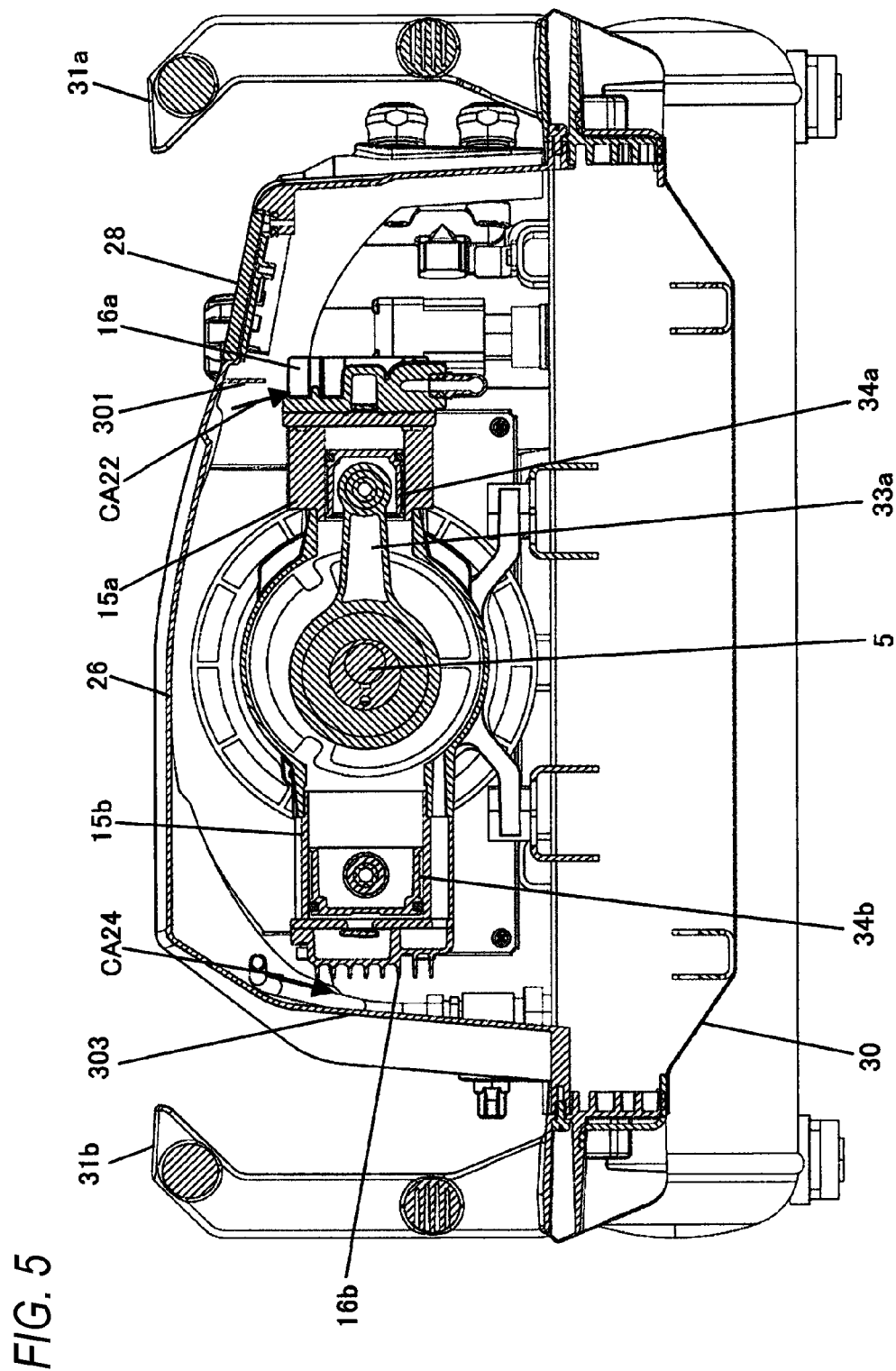
FIG. 5 is a front sectional view of the air compressor 1.
Figure 6:
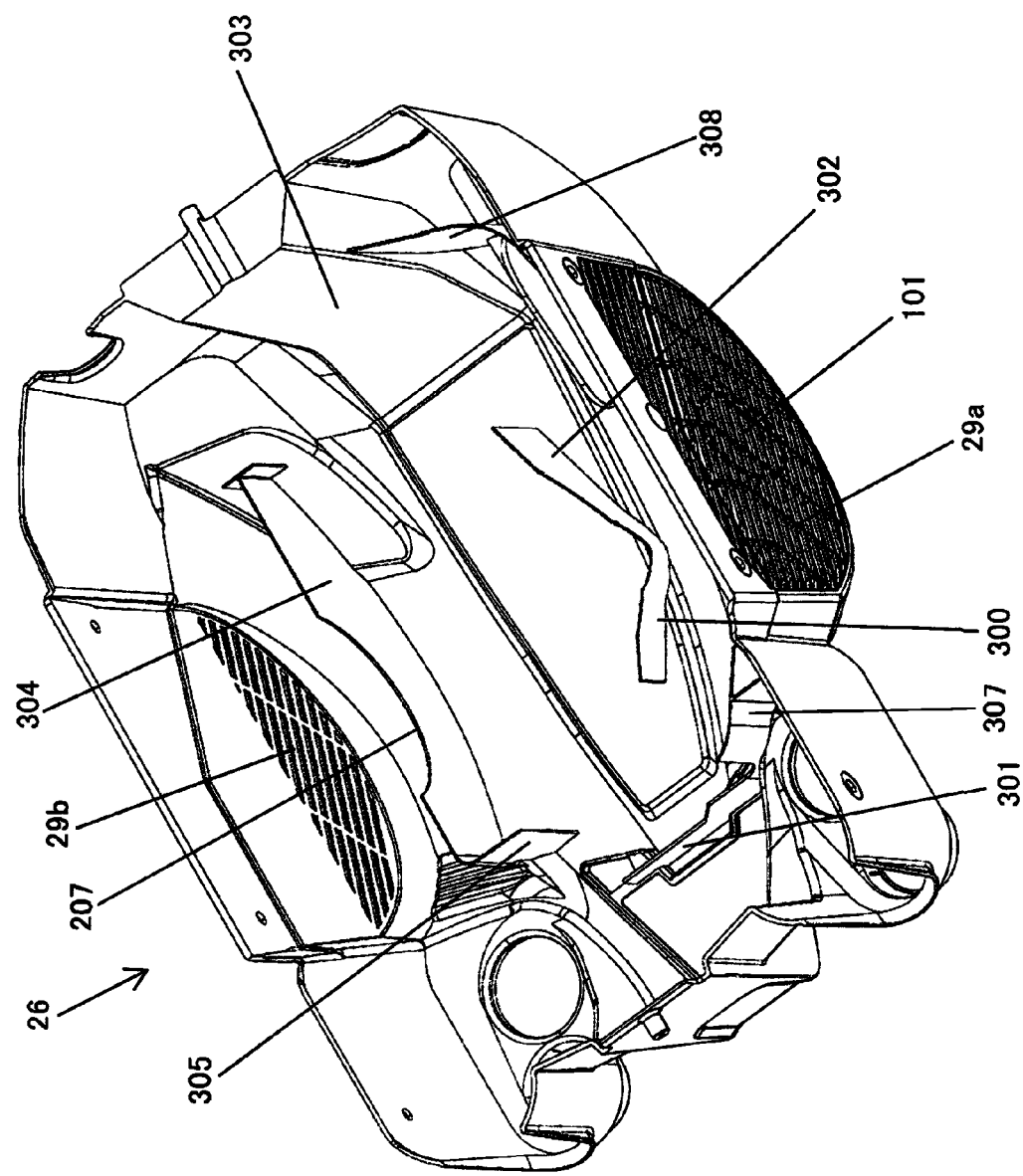
FIG. 6 is a first perspective view from below of the cover 26 of the air compressor 1.
Figure 7:
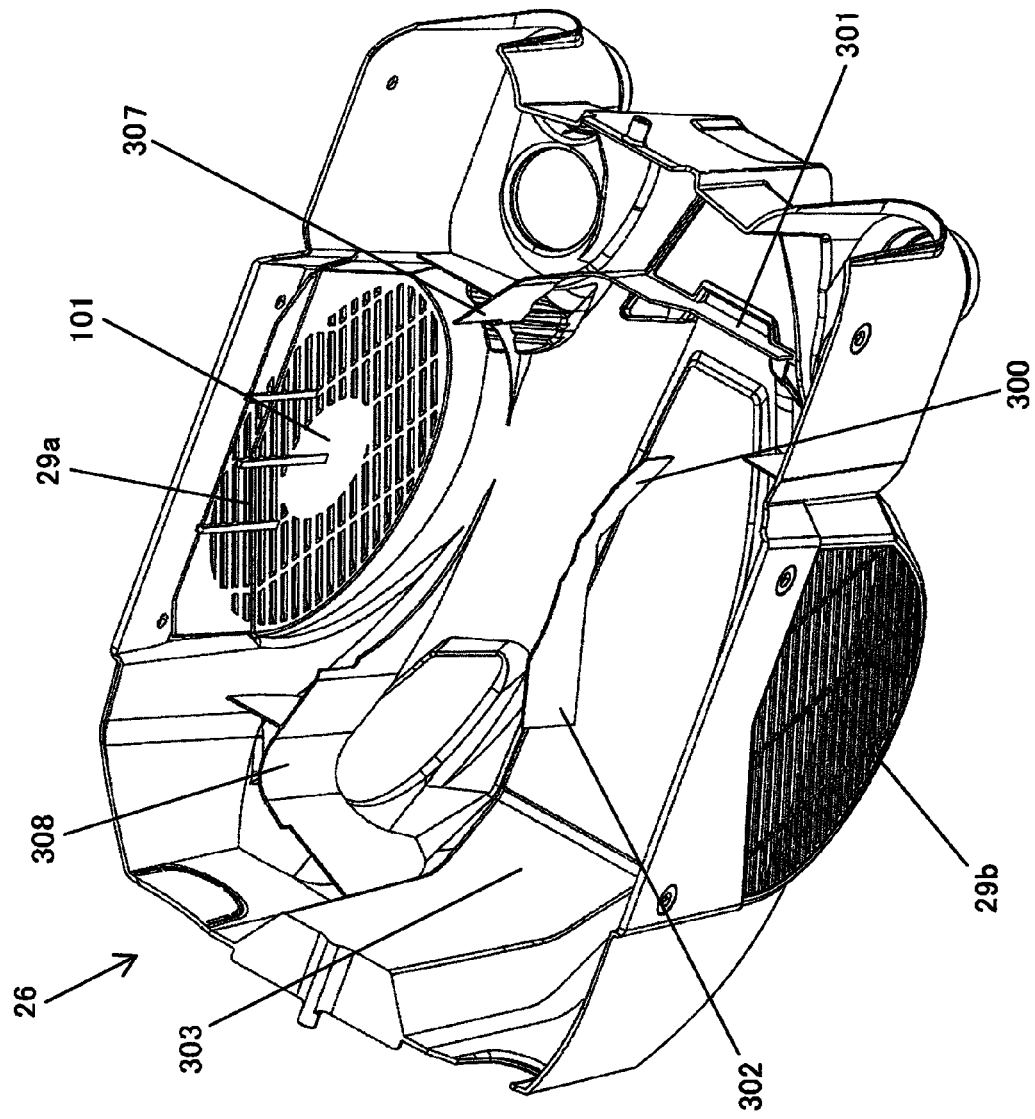
FIG. 7 is a second perspective view from below of the cover 26 of the air compressor 1.
Figure 8:
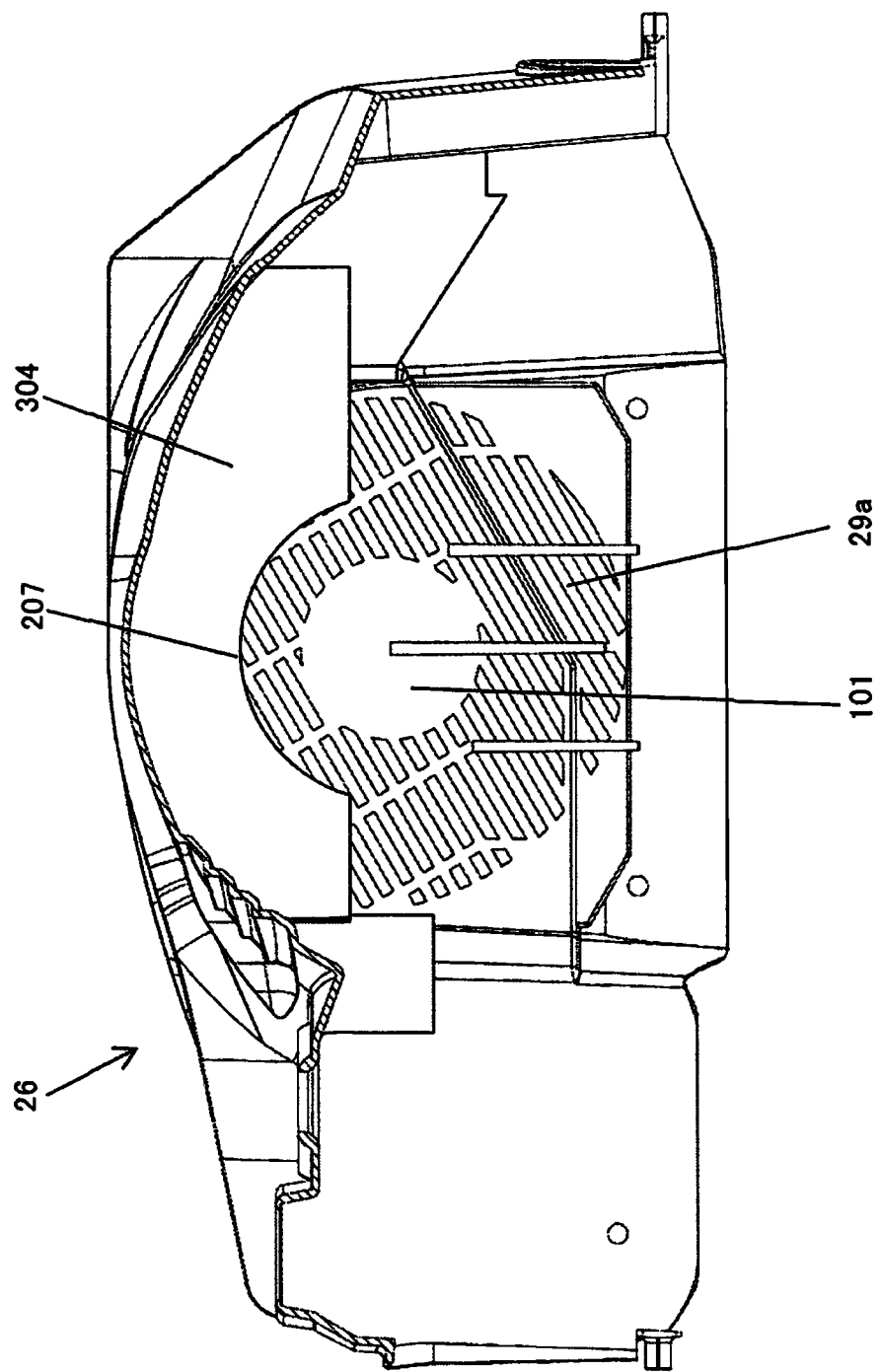
FIG. 8 is an VIII-VIII sectional view of FIG. 4 relating to the cover 26 of the air compressor 1.
Figure 9:
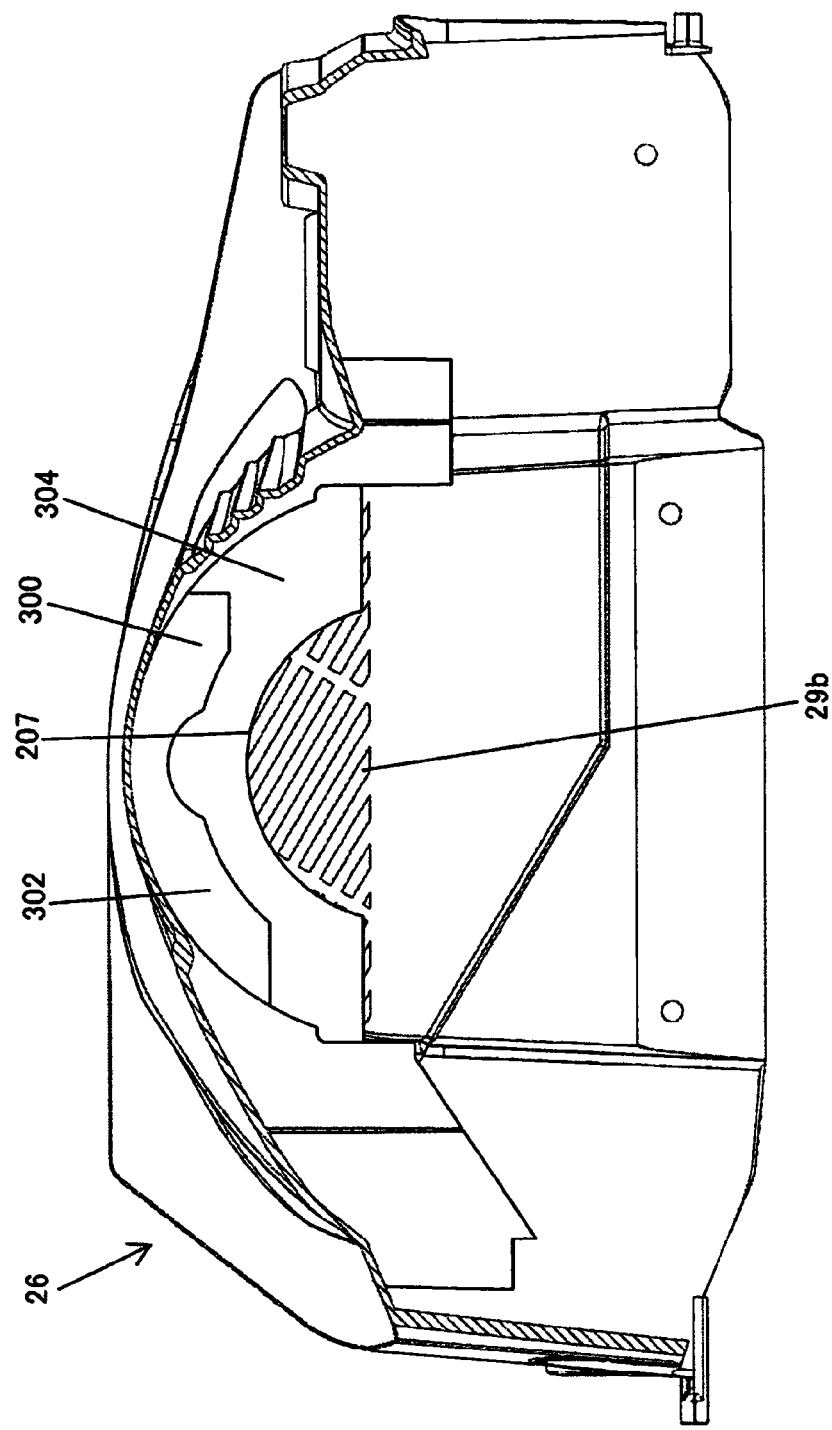
FIG. 9 is a IX-IX sectional view of FIG. 4 relating to the cover 26 of the air compressor 1.
Figure 10:
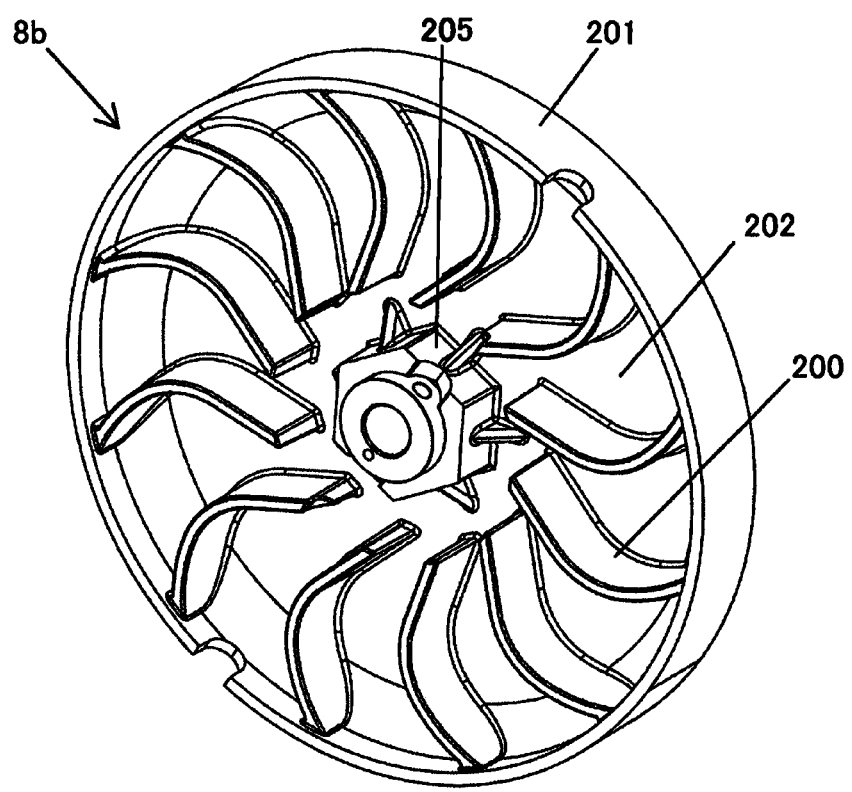
FIG. 10 is a perspective view of a cooling fan 8b of the air compressor 1.
Figure 11:
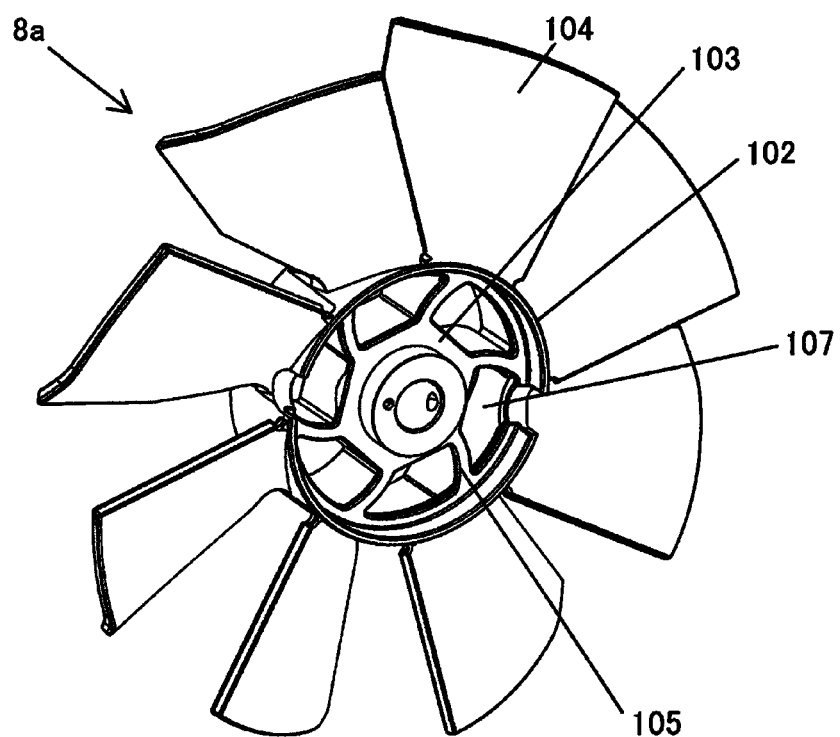
FIG. 11 is a perspective view of a cooling fan 8a of the air compressor 1.
Figure 12:
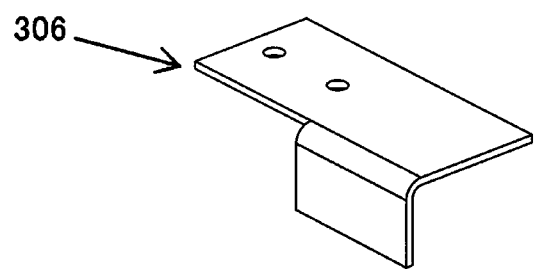
FIG. 12 is a perspective view of a seventh baffle plate 306 of the air compressor 1.

FIG. 1 is a perspective view of an air compressor 1 according to a first illustrative embodiment of the present invention. FIG. 2 is a plan view of the air compressor 1 in which a cover 26 is a cross-sectional surface. Incidentally, in FIG. 2, gripping parts 31a, 31b are not shown. FIG. 3 is a plan sectional view of the air compressor 1. FIG. 4 is a IV-IV sectional view of FIG. 2. FIG. 5 is a front sectional view of the air compressor 1. FIG. 6 is a first perspective view from below of the cover 26 of the air compressor 1. FIG. 7 is a second perspective view from below of the cover 26 of the air compressor 1. FIG. 8 is an VIII-VIII sectional view of FIG. 4 relating to the cover 26 of the air compressor 1. FIG. 9 is a IX-IX sectional view of FIG. 4. FIG. 10 is a perspective view of a cooling fan 8*b* of the air compressor 1. FIG. 11 is a perspective view of a cooling fan 8*a* of the air compressor 1. FIG. 12 is a perspective view of a seventh baffle plate 306 of the air compressor 1.

The air compressor 1 includes: a pair of air tanks 2*a*, 2*b* arranged to be parallel at a predetermined interval therebetween and storing therein compressed air; a compression part 3 for compressing air sucked from an outside and supplying the compressed air to the air tanks 2*a*, 2*b*; and a motor 4, which is connected to the compression part 3, for driving the compression part 3. The motor 4 and the compression part 3 are arranged above the pair of air tanks 2*a*, 2*b* such that an axis direction of the motor 4 is substantially perpendicular to a longitudinal direction of the air tanks 2*a*, 2*b*.

As shown in FIG. 3, a rotational shaft 5 of the motor 4 penetrates the compression part 3, and a cooling fan 8*a* (a first cooling fan) is provided at a motor-side end portion of the rotational shaft 5 of the motor 4 and a cooling fan 8*b* (a second cooling fan) is provided at a non-motor-side end portion of the rotational shaft 5 of the motor 4. The cooling fans 8*a*, 8*b* are rotated integrally with the motor 4.

As shown in FIG. 2, decompression valves 9*a*, 9*b*, pressure meters 10*a*, 10*b* for displaying a pressure of the decompressed compressed air and couplers 11*a*, 11*b* functioning as outlets of the compressed air are provided in the vicinity of the compression part 3 in the longitudinal direction of the pair of air tanks 2*a*, 2*b*. An operator connects the couplers 11*a*, 11*b* and a pneumatic tool (not shown) such as a nailing machine by an air hose for high pressure (not shown) and operates the pneumatic tool by using the compressed air to appropriately perform an operation.

As shown in FIG. 2, the air tanks 2*a*, 2*b* are provided with a safety valve 12 and a drain discharge device 13. The safety valve 12 is configured to discharge a part of the compressed air to the outside when a pressure is abnormally increased. The drain discharge device 13 has an operation part 14. When the operation part 14 is operated, the compressed air and moisture in the air tanks 2*a*, 2*b* can be appropriately discharged to the outside.

As shown in FIG. 3, the compression part 3 is provided therein with a crank mechanism. A rotational motion of the rotational shaft 5 of the motor 4 is converted into reciprocal motions of a first piston 34*a* and a second piston 34*b* through a first connecting rod 33*a* and a second connecting rod 33*b*, respectively. The first piston 34*a* is accommodated in a first cylinder 15*a* and a first cylinder head 16*a*. The second piston 34*b* is accommodated in a second cylinder 15*b* and a second cylinder head 16*b*. The first cylinder 15*a* and the second cylinder 15*b* are horizontally opposed to each other with the rotational shaft 5 of the motor 4 being interposed therebetween. The first cylinder 15*a* and the second cylinder 15*b* are arranged to be substantially parallel with the air tanks 2*a*, 2*b*, respectively. When the exterior air is sucked in the compression part 3, the air is first compressed by the second cylinder 15*b* (a low pressure-side cylinder) and the air compressed by the second cylinder 15*b* is supplied to the first cylinder 15*a* (a high pressure-side cylinder) through a piping 19*a* (refer to FIG. 2). The air further compressed by the first cylinder 15*a* is supplied to the air tank 2*a* through a piping 19*b*. The air tanks 2*a*, 2*b* are connected to each other by a connection pipe 20, so that the pressures of the air tanks 2*a*, 2*b* are uniform.

As shown in FIG. 3, a control circuit 21 (a control circuit board) for driving the motor 4 is accommodated in a case 22. The control circuit 21 is arranged to face the cooling fan 8*b* at the non-motor-side of the compression part 3. The control circuit 21 is fixed to the air tank 2*a*. The motor 4, which is a DC brushless motor, has a stator coil 23, a rotor 24 arranged in the stator coil 23 and a Hall element board 25 (refer to FIG. 2) for detecting a rotating position of the rotor 24. The motor 4 is inverter-controlled by the control circuit 21. The control circuit 21 includes a heat generation component 204 (refer to FIG. 3) such as a semiconductor switching element for inverter control. A surface of the case 22 on which the heat generation component 204 is attached is configured as a heat generation surface 203, from which a heat is to be radiated or which is to be cooled.

As shown in FIG. 1, a cover 26 for covering the components of the air compressor such as the compression part 3, the motor 4, the control circuit 21 and the like is arranged above the air tanks 2*a*, 2*b* and is fixed to the air tanks 2*a*, 2*b*. Both end portions of the air tanks 2*a*, 2*b* in the longitudinal direction are provided with gripping parts 31*a*, 31*b* for carrying the air compressor 1. The cover 26 is provided with an operation panel 26 having a power supply switch (not shown) for operating the air compressor 1 and the like. The cover 26 is provided with ventilating windows 29*a*, 29*b* (refer to FIGS. 6 and 7) on wall surfaces facing the cooling fans 8*a*, 8*b*. A cover 30 (refer to FIG. 4) for preventing foreign materials from being introduced is additionally attached between the air tanks 2*a*, 2*b*. The air tanks 2*a*, 2*b* are provided with leg parts 32 for preventing the air tanks 2*a*, 2*b* from directly contacting a ground to protect the air tanks 2*a*, 2*b*.

During an operation of the air compressor 1, the motor 4 is alternately applied with a compression load upon compression of the air by the reciprocal motions of the first piston 34*a* and the second piston 34*b*. For this reason, load currents are generated in the stator coil 23 and the control circuit 21, so that temperatures of the stator coil 23 and the control circuit 21 are increased by Joule heats accompanied by the load currents. Also, temperatures of the first cylinder 15*a*, the first cylinder head 16*a*, the second cylinder 15*b* and the second cylinder head 16*b* are increased by compression heat of the compressed air. Temperatures of the pipings 19*a*, 19*b* and the air tanks 2*a*, 2*b* are also increased because the compressed air whose temperature is increased by the compression heat flows therein. For this reason, it is necessary to suppress the increase in the temperature of the respective parts by the cooling, with a focus on the heat generation parts such as the first cylinder 15*a*, the first cylinder head 16*a*, the second cylinder 15*b*, the second cylinder head 16*b*, the stator coil 23, the control circuit 21, the case 22 and the like. Hereinafter, configurations relating to the cooling will be described.

(Cooling by Cooling Fan 8*a*)

In a typical axial flow fan, a generated air stream has a tendency to flow in an outer peripheral direction due to a high centrifugal force thereof. Therefore, it is difficult to promote the air stream in the adjacent motor, and thus the heat is likely to be accumulated in the motor. Here, a configuration for improving cooling performance of the motor 4 will be described.

As shown in FIG. 11, the cooling fan 8*a* has outer blades 104 and inner blades 105. The outer blades 104 and the inner blades 105 are connected to each other by a cylindrical partition part (cylindrical part) 102. The partition part 102 extends in a direction along the rotational shaft of the motor 4. An attaching part 103 is formed at a further inner side of the inner blades 105. The cooling fan 8a can be attached to the rotational shaft 5 of the motor 4 by the attaching part 103. The inner blades 105 are formed integrally with the partition part 102 and the attaching part 103. The inner blades 105 are formed into a curved plate shape extending substantially parallel with the rotational shaft 5 of the motor 4, a so-called centrifugal type. The cooling fan 8a has a through-hole, which is formed by the adjacent inner blades 105, partition part 102 and attaching part 103. The through-hole is formed such that an opening area of a non-motor-side opening 107 is smaller than an opening area of a motor-side opening 106 at an opposite side (refer to FIG. 3). The outer blades 104 are formed into a curved shape extending obliquely relative to the direction along the rotational shaft 5 of the motor 4, a so-called axial flow type. As shown in FIG. 3, an outer diameter D2 of the outer blades 104 is set to be larger than an outer diameter D1 of the motor 4. The cover 26 is formed with the ventilating window 29a facing the cooling fan 8a. A central portion of the ventilating window 29a is formed with a shield plate 101 (refer to FIGS. 7 and 8) facing the inner blades 105 and serving as a shield part.

When the motor 4 is operated, the cooling fan 8a is rotated to generate an air stream. That is, the exterior air is sucked from an outside through the ventilating window 29a by the outer blades 104, and an air stream CA1 flowing towards the first cylinder 15a, the first cylinder head 16a, the second cylinder 15b and the second cylinder head 16b, as shown in FIG. 3, is generated. Also, a part of the air stream generated by the outer blades 104 flows towards the stator coil 23, like an air stream CA2. At this time, by a negative pressure P1 additionally generated by the inner blades 105, the air in the vicinity of the stator coil 23 is sucked to the inner blades 105, like an air stream CA3. The air sucked to the inner blades 105 is enabled to flow out from the motor-side opening 106 towards the non-motor-side opening 107 by a negative pressure P2 generated by the outer blades 104, and is then sucked to the outer blades 104, like an air stream CA4. Thereafter, the air sucked to the outer blades 104 like the air stream CA4 is enabled to flow out together with the air stream CA1. As shown in FIG. 4, the cooling wind having completed the cooling is discharged to the outside of the cover 30 through between the air tanks 2a, 2b.

According thereto, it is possible to generate the air streams CA3, CA4 by the inner blades 105 (the air stream generated by the inner blades 105 is restrained by a cylindrical inner surface of the partition part 102 and is securely enabled to flow in a direction along a rotational shaft of the cooling fan 8a). Therefore, a synergetic effect with the air streams CA1, CA2 of the outer blades 104 can be exhibited, and it is possible to generate a high flow rate in the vicinity of the stator coil 23, in which the air stream is stagnant in the related art. According thereto, it is possible to effectively suppress the temperature increase of the stator coil 23. That is, it is possible to realize the auxiliary effect or synergetic effect for the air stream of the outer blades 104, which is likely to flow in the outer peripheral direction due to the high centrifugal force, by the inner blades 105, so that it is possible to improve the cooling performance of the motor 4 by the cooling fan 8a.

Further, the rotational shaft 5 of the motor 4 is alternately applied with the compression load upon the compression of the air in the first cylinder 15a and the second cylinder 15b, so that a rotational variation is generated. Thus, a distortion vibration due to the rotational variation is generated for the cooling fan 8a. However, the attaching part 103 and the partition part 102 are strongly connected using the plurality of inner blades 105. According thereto, it is possible to disperse and reduce the stress resulting from the distortion vibration, thereby increasing the strength and reliability of the cooling fan 8a. Further, since the inner blades 105 also serve as a connection part (a frame) connecting the partition part 102 and the attaching part 103 each other, it is not necessary to separately form a connection part, which does not contribute to the air stream, so that the structure is efficient. Incidentally, by increasing the number of the inner blades 105, it is possible to improve the performance of the inner blades 105 as a fan and to improve the connection strength of the partition part 102 and the attaching part 103.

Further, the cooling fan 8a has a difference in the opening area between the non-motor-side opening 107 and the motor-side opening 106. According thereto, it is easy to control the flowing direction of the air stream generated by the inner blades 105. That is, it is possible to appropriately control the flowing direction of the air stream generated by the inner blades 105 by appropriately adjusting an opening area ratio between the non-motor-side opening 107 and the motor-side opening 106.

Further, the outer blades 104 suck the air from the non-motor-side (the outside of the cover 26) and enable the air stream to flow out towards the motor 4 and the compression part 3. Therefore, it is possible to suck a large amount of the exterior air having a temperature lower than the temperature in the cover 26 into the cover 26 and to extensively cool the motor 4, the compression part 3 and the like.

Further, since the shield plate 101 is provided, the negative pressure P2 between the cooling fan 8a and the shield plate 101 by the action of the outer blades 104 is enhanced. According thereto, it is possible to further promote the air streams CA3, CA4, thereby considerably improving the cooling efficiency. That is, it is possible to enable the air in the vicinity of the motor 4, which is sucked to the central part of the cooling fan 8a by the negative pressure (suction) by the inner blades 105, to smoothly flow towards the non-motor-side of the inner blades 105 and to further improve the cooling effect in the vicinity of the motor by the synergetic effect of the negative pressures of the outer blades 104 and the inner blades 105.

Further, the outer diameter D2 of the outer blades 104 is set to be larger than the outer diameter D1 of the motor 4. According thereto, a part of the air stream generated by the outer blades 104 is directly supplied to the compression part 3 without via the motor 4. As a result, it is possible to improve the cooling efficiency of the compression part 3.

Further, the air volume by the outer blades 104 is set to be larger than the air volume enabled to flow through the inner side of the partition part 102 by the inner blades 105. According thereto, it is easy to enable a part of the air stream, which is generated by the inner blades 105 mainly generating the air stream in the vicinity of the motor 4, to flow together with the air stream generated by the outer blades 104. Therefore, it is possible to securely supply the air stream after the cooling of the motor to the compression part 3 and to finally discharge the air stream to the outside of the cover. Thus, it is possible to exclude the bad influence on the cooling performance, which is caused as the heat is accumulated in the vicinity of the motor 4, thereby improving the cooling performance.

Incidentally, it may be possible to appropriately change the area ratio between the motor-side opening 106 and the non-motor-side opening 107 of the cooling fan 8a and to appropriately change the shapes of the inner blade 105 and the outer blade 104.

(Cooling by Cooling Fan 8b)

In general, the air compressor has a plurality of heat generation parts in which the temperature thereof is high in accordance with using the motor, the compression part (particularly, the cylinder), the control circuit and the like. Thus, in many cases, the heat generation parts should be arranged at spaced positions. Therefore, it is necessary to securely guide the cooling air generated by the cooling fan attached to the rotational shaft of the motor to the respective heat generation parts. However, the heat generation part may be positioned at a place that is difficult to be cooled by the general cooling fan, due to a layout, which is a problem to be solved with respect to the cooling efficiency. Regarding this problem, a configuration for improving the cooling efficiency will be described.

As shown in FIGS. 3 and 4, the case 22 and the control circuit 21 are arranged to face the cooling fan 8b that is attached to the end portion of the non-motor-side of the rotational shaft 5 of the motor 4. In the case 22, the heat generation surface 203 of the accommodated control circuit 21, on which the heat generation component 204 is mounted, faces the cooling fan 8b. The heat generation component 204 faces an outer peripheral part (a ring part 201 that will be described later) of the cooling fan 8b with the heat generation surface 203 being interposed therebetween. The heat generation component 204 is an IGBT (insulated gate bipolar transistor), a diode bridge, an IPM (intelligent power module) and the like.

As shown in FIG. 10, the cooling fan 8b has a back plate 202 serving as a plate shape part formed on a flat plate, a normal line of which is set to a direction along the rotational shaft 5 of the motor 4. Blades 200 extending substantially parallel with the rotational shaft 5 of the motor 4 from an inner side of the back plate 202 towards an outer periphery thereof are centrifugally formed on the back plate 202. An attaching part 205 is formed at an inner side of the blades 200. The cooling fan 8b can be attached to the rotational shaft 5 of the motor 4 by the attaching part 205. The outer peripheral end of the cooling fan 8b is formed with the ring part 201. The ring part 201 has a cylindrical shape substantially parallel with the rotational shaft 5 of the motor 4. The ring part 201 extends from the back plate 202 towards the heat generation surface 203. The ring part 201 and the attaching part 205 are connected and integrated over an entire circumference by the back plate 202. The back plate 202 entirely closes the motor-side between the ring part 201 and the attaching part 205.

Further, as shown in FIG. 2, a fifth baffle plate 304 (a baffle wall part), a sixth baffle plate 305 (a baffle wall part) and a seventh baffle plate 306 (a baffle wall part) are provided in the vicinity of the cooling fan 8b. The fifth baffle plate 304 and the sixth baffle plate 305 are formed as ribs hanging from the cover 26. The seventh baffle plate 306 shown as a unitary member in FIG. 12 is attached to the case 22 by a screw material. The seventh baffle plate 306 is formed from the case 22 towards the non-motor-side of the second cylinder 15b, as shown in FIG. 2. The fifth baffle plate 304 hangs from the cover 26 towards the case 22. The fifth baffle plate 304 is formed with an opening 207 (a notched portion) having a diameter that is smaller than a diameter D3 (refer to FIG. 4) of the cooling fan 8b (refer to FIGS. 4 and 6 and the like). The sixth baffle plate 305 is formed integrally with the fifth baffle plate 304 and is smoothly formed from the fifth baffle plate 304 towards the non-motor-side of the first cylinder 15a. A wall surface of the cover 26 facing the cooling fan 8b is formed with the ventilating window 29b.

As shown in FIG. 3, when the motor 4 is operated, the exterior air is sucked from the outside through the ventilating window 29b by the cooling fan 8b, like an air stream CA10, and is guided to the central part of the cooling fan 8b by the opening 207. The air stream CA10 flows towards the outer periphery of the cooling fan 8b along the back plate 202, like an air stream CA11. Then, as shown in FIG. 3, the air stream CA11 is deflected (a flowing direction thereof is changed) by the ring part 201 such that the flowing direction of the air stream CA11 closes to parallel with the suction direction of the air stream CA10 by the cooling fan 8b, flows towards and collides with the heat generation surface 203 (a first heat generation part) and further flows radially from the cooling fan 8b along the heat generation surface 203. A part of the air stream CA11 is guided towards the non-motor-sides (a second heat generation part) of the first cylinder 15a and the second cylinder 15b by the fifth baffle plate 304, the sixth baffle plate 305 and the seventh baffle plate 306, like air streams CA12, CA13. The cooling air having completed the cooling is discharged to the outside of the cover 30 through between the air tanks 2a, 2b, as shown in FIG. 4.

In this way, the cooling air is deflected by the ring part 201 and is thus enabled to securely collide with the heat generation surface 203. According thereto, it is possible to remarkably improve the cooling efficiency of the heat generation surface 203. Further, by providing the back plate 202, it is possible to enable the more cooling air to securely flow towards the non-motor-side (the heat generation surface 203-side), so that it is possible to further improve the cooling efficiency of the heat generation surface 203. Further, since the air flow can be enabled to flow out so as to be ejected towards the heat generation surface 203 that is arranged in front of the cooling fan 8b, it is possible to further improve the cooling efficiency. That is, since the cooling fan 8b sucks centrally the air and enables the air to flow out in the outer peripheral direction by using the blades 200 and the back plate 202 and applies an axial component (a component facing the non-motor-side) in the outflow direction of the air stream by the ring part 201, it is also possible to securely supply the cooling air to the heat generation surface 203, which exists on a plane different from the cooling fan 8b. The cooling air supplied to the heat generation surface 203 is mainly the exterior air introduced through the ventilating window 29b and not used yet for another cooling. Therefore, the cooling efficiency of the heat generation surface 203 is favorable.

Further, it is possible to utilize the cooling air having cooled the heat generation surface 203 and the cooling air having not reached the heat generation surface 203 for cooling the first cylinder 15a and the second cylinder 15b by the fifth baffle plate 304, the sixth baffle plate 305 and the seventh baffle plate 306. The effect of this configuration is very advantageous, because the non-motor-sides of the first cylinder 15a and the second cylinder 15b are difficult to be cooled by the air stream CA1 generated by the cooling fan 8a and the temperatures thereof are likely to increase.

Further, the rotational shaft 5 of the motor 4 is alternately applied with the compression load upon the compression of the air in the first cylinder 15a and the second cylinder 15b, so that a rotational variation is generated. Thus, a distortion vibration due to the rotational variation is generated for the cooling fan 8b. However, since the ring part 201 is connected by the back plate 202, a section modulus of a cross-section, a normal line of which extends in the direction along the rotational shaft 5 of the motor 4, is remarkably increased, so that it is possible to obtain the sufficient strength against the centrifugal load and the distortion vibration load. Further, since the back plate 202 is provided with the blades 200, it is also possible to increase the strength of the blades 200. Incidentally, it is preferable to connect the ring part 201 and the attaching part 205 such that the back plate 202 entirely closes the motor-side between the ring part 201 and the attaching part 205, from a standpoint of increasing the cooling efficiency of the first heat generation part. Alternatively, a structure where the ring part 201 and the attaching part 205 are connected such that the back plate 202 partially closes the motor-side may also be possible.

Further, the ring part 201 has not only the function of changing the direction of the cooling air but a flywheel ring function of increasing the inertia force of the cooling fan 8b to thus relieve the rotational variation, thereby reducing the load to the motor 4 due to the rotational variation, which is structurally efficient. From another standpoint, the ring part 201 functioning as the flywheel ring is provided with the function of changing the direction of the cooling air, so that the ring part 201 can be used to improve the cooling efficiency, which is also structurally efficient.

Incidentally, the blades 200 are not limited to the centrifugal type and may be appropriately changed. The ring part 201 is not necessarily a complete cylindrical shape and may be formed to deflect the cooling air towards a heat generation part in addition to the control circuit 21 the case 22 and the heat generation surface 203. The ring part 201 is not necessarily parallel with the rotational shaft 5 of the motor 4 and may be inclined relative to the back plate 202 to guide the cooling air towards the first heat generation part. The cooling fan 8b may be attached such that the back plate 202 faces towards the ventilating window 29b of the cover 26.

(Cooling of Cylinder Head)

During the compression process by the piston in the compression part 3, the compressed air, which has been heated by the compression, is supplied into the cylinder head at a high flow rate and is then stored in the air tank through the piping. Therefore, since the high-temperature air flows at the high flow rate in the cylinder head, the heat transfer from the high-temperature air to the cylinder head is made to a remarkable extent, and the cylinder head of the compression part 3 becomes high temperatures. Thus, for the efficient cooling, it is required to intensively cool the cylinder head becoming the highest temperature. Hereinafter, a configuration for efficiently cooling the cylinder head will be described.

As shown in FIG. 2, a first baffle plate 300 (a baffle wall part) is arranged in a substantially linear shape in the cover 26 such that a virtual extension line inclined relative to the rotational shaft 5 of the motor 4 passes above the first cylinder head 16a, when seen from above, towards the first cylinder 15a that is positioned at a downstream side in the rotating direction from the cooling fan 8a. Here, the virtual extension line of the first baffle plate 300 coincides with a linear approximation straight line of the first baffle plate 300. An air path or virtual extension line of the air path following a wall surface of the first baffle plate 300 facing towards the cooling fan 8a intersects with the first cylinder head 16a, when seen from above.

A second baffle plate 301 (a baffle wall part) is arranged above the first cylinder head 16a such that the second baffle plate 301 hangs from the cover 26 towards the first cylinder head 16a (refer to FIG. 5). The second baffle plate 301 is provided to intersect with the air path or virtual extension line of the air path following the first baffle plate 300 or the linear approximation straight line of the first baffle plate 300, and to enable the air stream guided to the first baffle plate 300 to flow towards the first cylinder head 16a or a vicinity thereof.

A third baffle plate 302 (a baffle wall part) is arranged in a substantially linear shape at the second cylinder head 16b-side such that a virtual extension line inclined relative to the rotational shaft 5 of the motor 4 passes above the second cylinder head 16b, when seen from above. Here, the virtual extension line of the third baffle plate 302 coincides with a linear approximation straight line of the third baffle plate 302. An air path or virtual extension line of the air path following a wall surface of the third baffle plate 302, which faces towards the cooling fan 8a, intersects with the second cylinder head 16b, when seen from above.

A fourth baffle plate 303 (a baffle wall part) is arranged to face the second cylinder head 16b (refer to FIG. 5). The fourth baffle plate 303 is provided to intersect with the air path or virtual extension line of the air path following the third baffle plate 302 or the linear approximation straight line of the third baffle plate 302, such that the fourth baffle plate 303 enables the air stream guided to the third baffle plate 302 to flow towards the second cylinder head 16b or a vicinity thereof.

The first baffle plate 300 and the third baffle plate 302 are connected above the rotational shaft 5 of the motor 4 to thus form a substantial V shape. Further, as shown in FIGS. 6 and 7, the first baffle plate 300, the second baffle plate 301 and the third baffle plate 302 are formed as ribs extending (protruding downwardly) integrally from the cover 26, and the fourth baffle plate 303 is formed on a part of the wall surface of the cover 26. As shown in FIG. 2, the first baffle plate 300 and the third baffle plate 302 are provided to form different angles relative to the rotational shaft 5 of the motor 4 so as to favorably cool the first cylinder head 16a and the second cylinder head 16b.

An eighth baffle plate 307 and a ninth baffle plate 308 (refer to FIG. 7) are provided so as to prevent the air from going round from the motor-side of the cooling fan 8a towards the non-motor-side and to prevent the air from flowing out more outwards than the first cylinder head 16a and the second cylinder head 16b in the cover 26. The eighth baffle plate 307 and the ninth baffle plate 308 are formed as ribs extending (hanging) integrally from the cover 26.

During the operation of the air compressor 1, the rotational shaft 5 of the motor 4 is rotated to generate the compressed air, and the cooling fan 8a is rotated to suck the air from the ventilating window 29a into the cover 26, as shown in FIG. 2. The cooling air turns along the rotating direction of the cooling fan 8a, like an air stream CA20 (refer to FIG. 2) and flows along the rotational shaft 5 of the motor 4 towards the compression part 3. Then, the cooling air is guided to the first cylinder head 16a by the first baffle plate 300 (and the upper surface of the cover 26), like an air stream CA21, and is enabled to further flow to be ejected to the first cylinder head 16a by the second baffle plate 301, like an air stream CA22, as shown in FIG. 5. Therefore, since it is possible to form the flowing so that the cooling air securely reaches the first cylinder head 16a by the first baffle plate 300 and the second baffle plate 301, it is possible to cool the first cylinder head 16a very effectively. Here, since the air stream flows along the wall surface at the high flow rate, by making the linear approximation straight line or virtual extension line of the first baffle plate 300 to face towards the first cylinder head 16a when seen from above, it is possible to securely guide the air stream of high flow rate to the first cylinder head 16*a* whose temperature is likely to increase. As a result, it is possible to realize the high cooling effect.

Further, a part of the air stream CA20 is guided to the second cylinder head 16*b* by the third baffle plate 302 (and the upper surface of the cover 26), like an air stream CA23, and is then enabled to flow to be ejected to a vicinity of the second cylinder head 16*b* by the fourth baffle plate 303, like an air stream CA24, as shown in FIG. 5. Therefore, since it is possible to form the flowing such that the cooling air securely reaches the second cylinder head 16*b* by the third baffle plate 302 and the fourth baffle plate 303, it is possible to cool the second cylinder head 16*b* very effectively. Here, since the air stream flows along the wall surface at the high flow rate, by making the linear approximation straight line or virtual extension line of the third baffle plate 302 to face towards the second cylinder head 16*b*, when seen from above, it is possible to securely guide the air stream of high flow rate to the second cylinder head 16*b* whose temperature is likely to increase. As a result, it is possible to realize the high cooling effect.

Further, the first baffle plate 300 and the third baffle plate 302 are connected above the rotational shaft 5 of the motor 4 to thus distribute an amount of the cooling air to the first cylinder head 16*a* and the second cylinder head 16*b*, so that an air volume of the first baffle plate 300 along the rotating direction of the cooling fan 8*a* is set to be large. Therefore, it is possible to prevent an air path resistance due to the third baffle plate 302, which is arranged against the rotating direction of the cooling fan 8*a*, from being excessively high, so that it is possible to favorably cool the first cylinder head 16*a* and the second cylinder head 16*b*. That is, since the air volume guided by the first baffle plate 300 following the turning direction of the air stream is set to be larger than the air volume guided by the third baffle plate 302 arranged against the turning direction of the air stream, it is possible to cool both the first cylinder head 16*a* and the second cylinder head 16*b* while suppressing the increase in the air path resistance due to the third baffle plate 302. The cooling air having completed the cooling is discharged to the outside of the cover 30 mainly through between the air tanks 2*a*, 2*b*.

Incidentally, the first baffle plate 300 and the third baffle plate 302 are ideally formed to have a linear shape so as to minimize the air path resistance (the wall surfaces facing towards the cooling fan 8*a*-side are formed to be planar). However, even though the first baffle plate 300 and/or the third baffle plate 302 are partially curved/bent so as to avoid other components, for example, it is possible to guide the cooling air to the first cylinder head 16*a* or second cylinder head 16*b* inasmuch as the linear approximation straight line is formed to pass above the first cylinder head 16*a* or second cylinder head 16*b*.

Second Illustrative Embodiment

Figure 13:
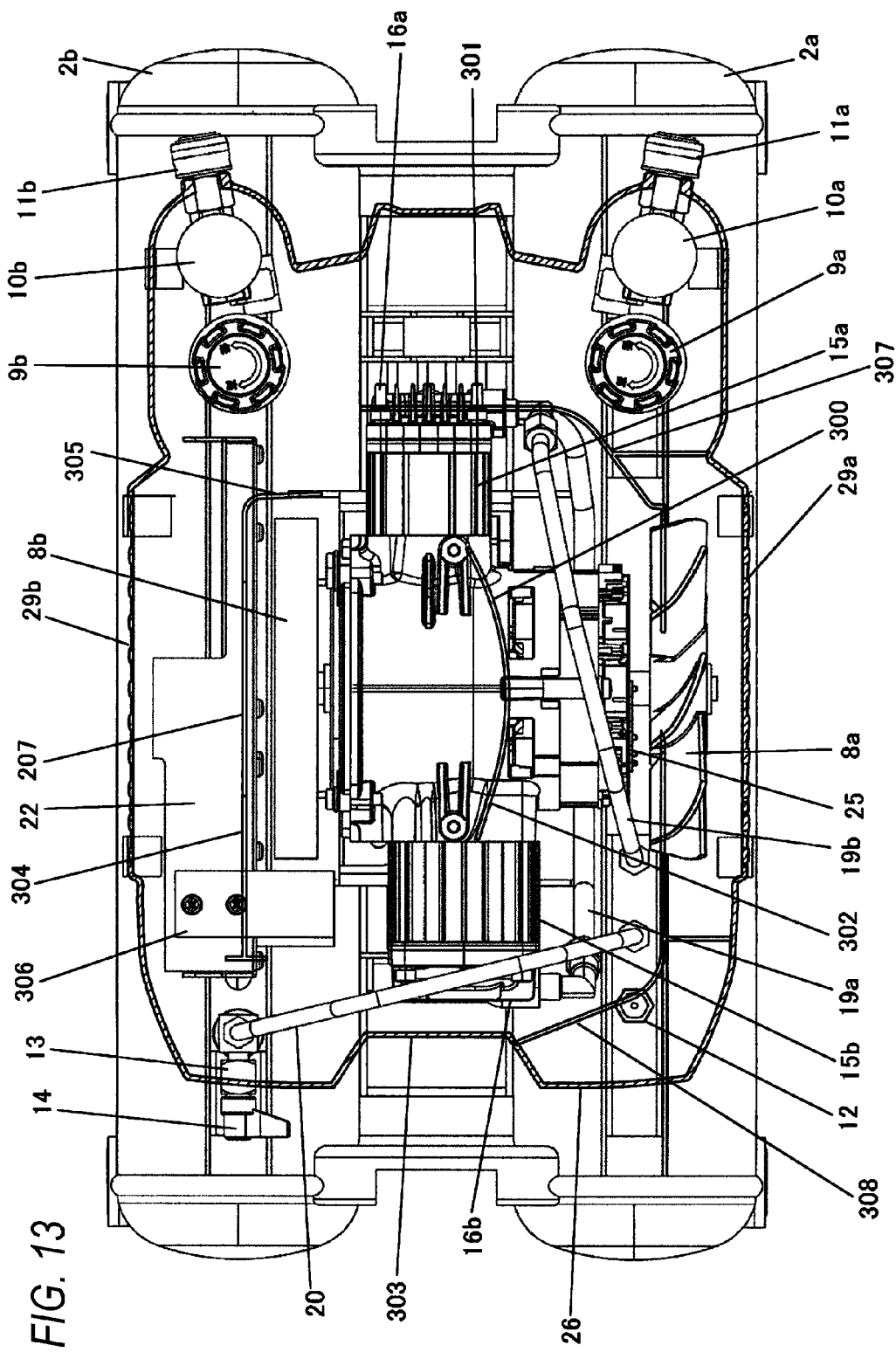
FIG. 13 is a plan view of an air compressor according to a second illustrative embodiment of the present invention, in which the cover 26 is a cross-sectional surface.

FIG. 13 is a plan view of an air compressor according to a second illustrative embodiment of the present invention, in which the cover 26 is a cross-sectional surface. The air compressor of this illustrative embodiment is the same as the first illustrative embodiment, except that the first baffle plate 300 and the third baffle plate 302 are curved to be convex towards the cooling fan 8*a*-side. The linear approximation straight lines and virtual extension lines of the first baffle plate 300 and the third baffle plate 302 intersect with the first cylinder head 16*a* and the second cylinder head 16*b*, when seen from above. Also in this illustrative embodiment, it is possible to obtain the same effects as the first illustrative embodiment.

Third Illustrative Embodiment

Figure 14:
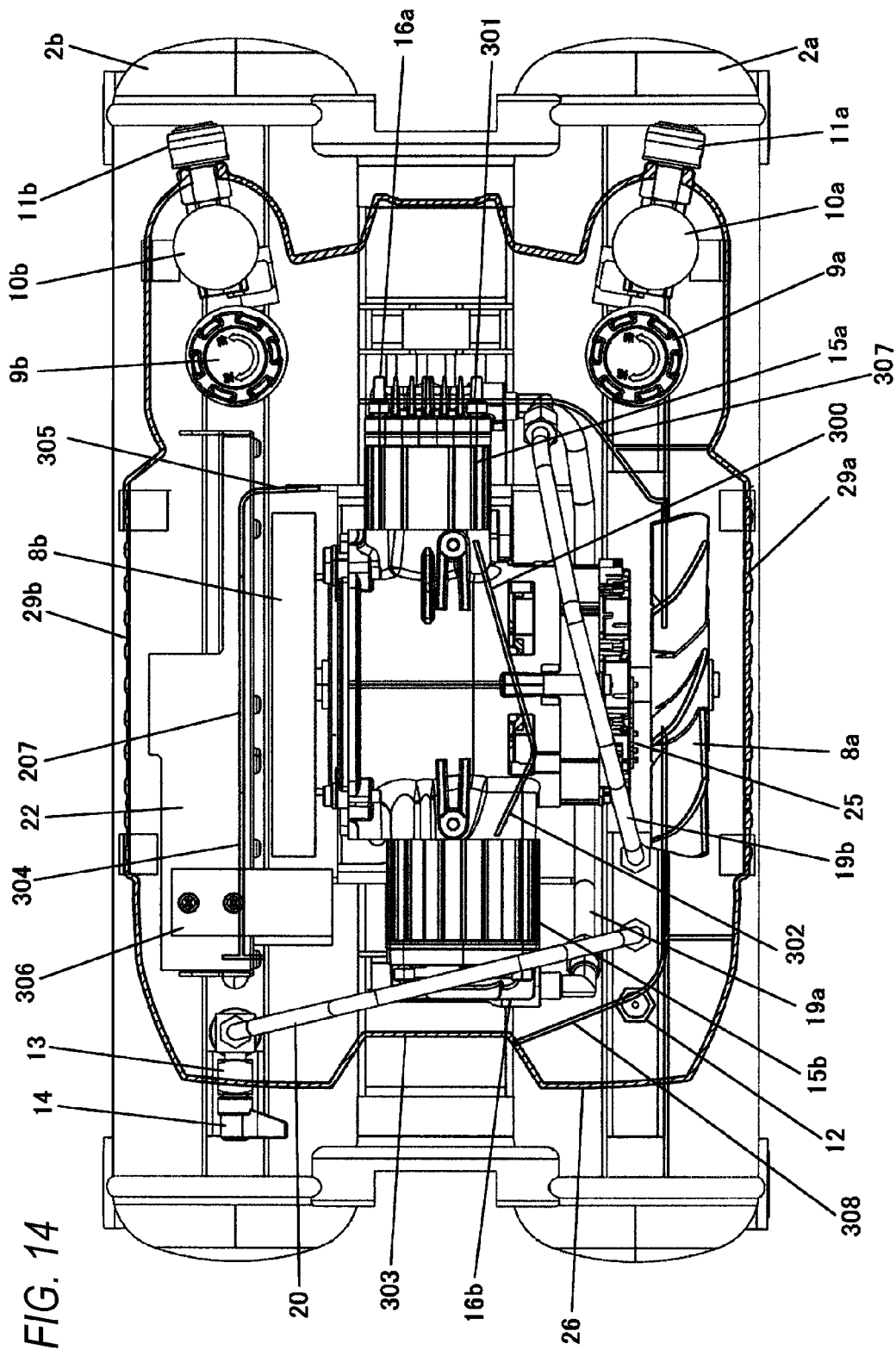
FIG. 14 is a plan view of an air compressor according to a third illustrative embodiment of the present invention, in which the cover 26 is a cross-sectional surface.

FIG. 14 is a plan view of an air compressor according to a third illustrative embodiment of the present invention, in which the cover 26 is a cross-sectional surface. The air compressor of this illustrative embodiment is the same as the first illustrative embodiment, except that the connection part between the first baffle plate 300 and the third baffle plate 302 is shifted from the upper of the rotational shaft 5 of the motor 4 towards the second cylinder head 16*b*. In this illustrative embodiment, the air volume to the first cylinder head 16*a* is increased and the air volume to the second cylinder head 16*b* is decreased, as compared to the first illustrative embodiment. However, it is possible to reduce the air path resistance due to the third baffle plate 302 arranged against the turning direction of the air stream.

Fourth Illustrative Embodiment

Figure 15:
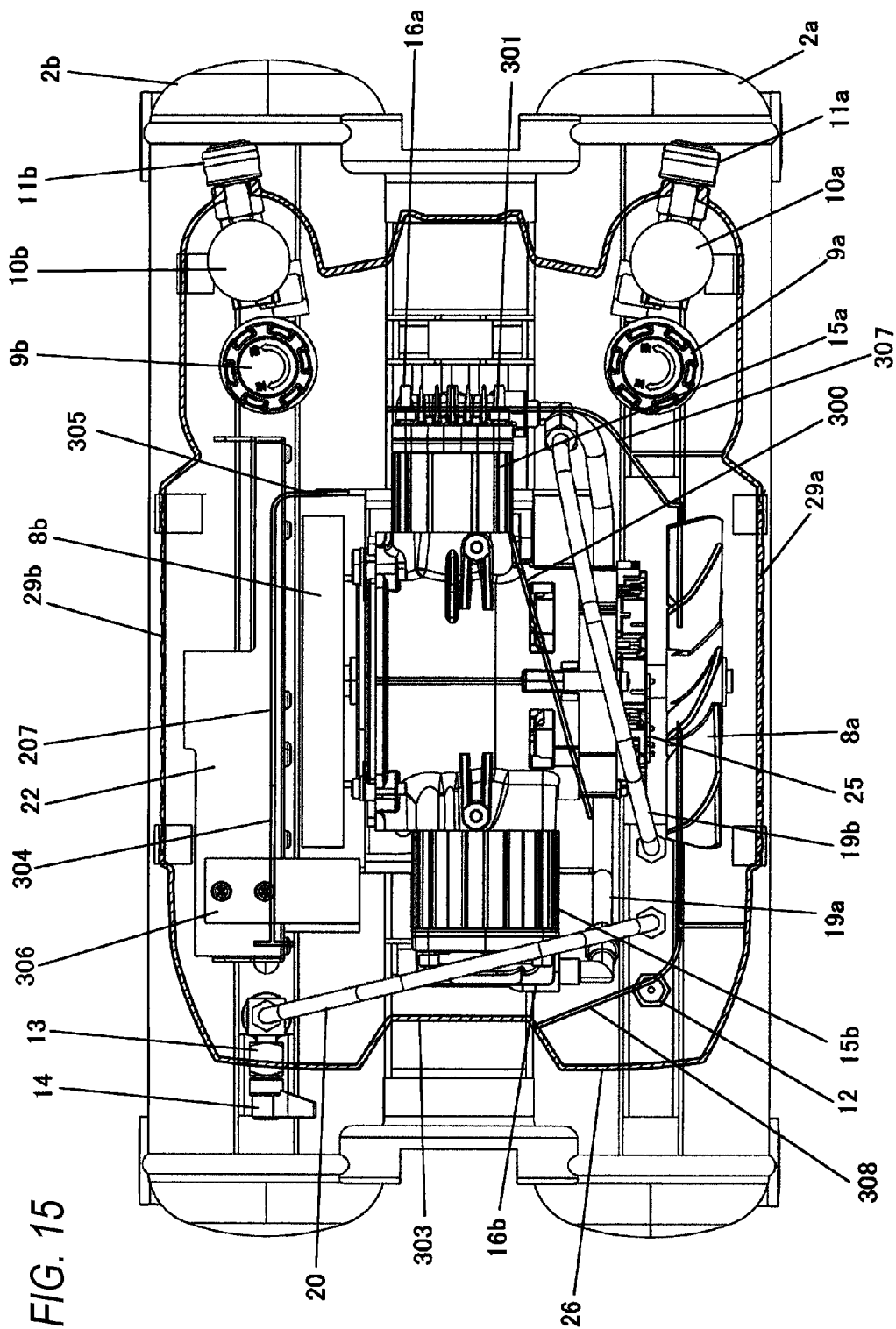
FIG. 15 is a plan view of an air compressor according to a fourth illustrative embodiment of the present invention, in which the cover 26 is a cross-sectional surface.

FIG. 15 is a plan view of an air compressor according to a fourth illustrative embodiment of the present invention, in which the cover 26 is a cross-sectional surface. The air compressor of this illustrative embodiment is the same as the first illustrative embodiment, except that the third baffle plate 302 is omitted and the first baffle plate 300 extends up to the second cylinder head 16*b*-side. In this illustrative embodiment, the air volume to the first cylinder head 16*a* is increased and the air volume to the second cylinder head 16*b* is decreased, as compared to the first illustrative embodiment. However, since the third baffle plate 302 arranged against the turning direction of the air stream is omitted, the air path resistance is reduced.

Although the present invention has been described with reference to the illustrative embodiments, it can be understood by one skilled in the art that the respective elements and respective processes of the illustrative embodiments can be variously modified within the scope defined in the claims.

The following matters may also be disclosed in this specification.

(1) An air compressor comprising: an air tank configured to store therein compressed air; a compression part configured to compress air sucked from an outside and to supply the air to the air tank; a motor configured to drive the compression part; a cooling fan provided at one end-side of a rotational shaft of the motor and in the vicinity of the motor; and a cover configured to cover at least the compression part and the motor, wherein the cooling fan comprises: an outer blade configured to supply an air stream to the compression part; an inner blade configured to enable an air stream to flow in a direction along a rotational shaft of the cooling fan at an inner side of the outer blade; and a partition part interposed between the outer blade and the inner blade.

(2) The air compressor according to (1), wherein the outer blade is an axial flow type, and wherein the inner blade is a centrifugal type.

(3) The air compressor according to (1) or (2), wherein the cooling fan is configured such that an attaching part to the rotational shaft of the motor is connected to the partition part by using at least a part of the inner blade.

(4) The air compressor according to any one of (1) to (3), wherein the inner blade is configured to generate an air stream at an inner side of the motor.

(5) The air compressor according to any one of (1) to (4), wherein an air stream outflowing from the outer blade flows at an outer peripheral side of the motor, and wherein an air stream sucked to the inner blade flows at an inner peripheral side of the motor.

(6) The air compressor according to any one of (1) to (5), wherein the inner blade has a surface extending parallel with the rotational shaft of the motor.

(7) The air compressor according to (6), wherein the inner blade is curved.

(8) The air compressor according to any one of (1) to (7), wherein at an inner side of the partition part, the cooling fan further comprises a motor-side opening and a non-motor-side opening, and wherein an opening area of the motor-side opening and an opening area of the non-motor-side opening are different.

(9) The air compressor according to any one of (1) to (8), wherein the outer blade is configured to suck the air at least from a non-motor-side and to supply the air stream towards the motor and the compression part, and wherein the cover comprises a ventilating window at a part facing a non-motor-side of the cooling fan.

(10) The air compressor according to (9), wherein the cover comprises a shield part for blocking inflow of exterior air at at least a part of a region facing the inner blade of the cooling fan.

(11) The air compressor according to any one of (1) to (10), wherein an outer diameter of the outer blade is larger than an outer diameter of the motor.

(12) The air compressor according to any one of (1) to (11), wherein an air volume generated by the outer blade is larger than an air volume enabled to flow along an inner side of the partition part by the inner blade.

(13) The air compressor according to any one of (1) to (12), wherein the partition part has a cylindrical shape extending in the direction along the rotational shaft of the motor.

What is claimed is:

1. An air compressor comprising:
   an air tank configured to store therein compressed air;
   a compression part configured to compress air sucked from an outside and to supply the air to the air tank;
   a motor configured to drive the compression part;
   a cooling fan provided at one end-side of a rotational shaft of the motor and in the vicinity of the motor; and
   a cover configured to cover at least the compression part and the motor,
   wherein the cooling fan comprises:
     an outer blade configured to supply an air stream to the compression part;
     an inner blade configured to direct an air stream to flow in a direction along a rotational shaft of the cooling fan at an inner side of the outer blade; and
     a partition part interposed between the outer blade and the inner blade and
   wherein the outer blade, inner blade and the partition part are configured to direct, from an inside of the motor, an air stream outflowing from the outer blade in a direction away from the cooling fan towards an outer peripheral side of the motor, and an air stream sucked to the inner blade in a direction toward the cooling fan at an inner peripheral side of the motor.

2. The air compressor according to claim 1, wherein the outer blade is an axial flow type, and
   wherein the inner blade is a centrifugal type.

3. The air compressor according to claim 1, wherein the cooling fan further comprises an attaching part configured to connect the rotational shaft of the motor to the partition part and at least a part of the inner blade.

4. The air compressor according to claim 1, wherein the inner blade has a surface extending parallel with the rotational shaft of the motor.

5. The air compressor according to claim 4, wherein the inner blade is curved.

6. The air compressor according to claim 1, wherein at an inner side of the partition part, the cooling fan further comprises a motor-side opening and a non-motor-side opening, and
   wherein an opening area of the motor-side opening and an opening area of the non-motor-side opening are different.

7. The air compressor according to claim 1, wherein the outer blade is configured to suck the air at least from a non-motor-side and to direct the air stream towards the motor and the compression part, and
   wherein the cover comprises a ventilating window at a part facing a non-motor-side of the cooling fan.

8. The air compressor according to claim 7, wherein the cover comprises a shield part for blocking inflow of exterior air at at least a part of a region facing the inner blade of the cooling fan.

9. The air compressor according to claim 1, wherein an outer diameter of the outer blade is larger than an outer diameter of the motor.

10. The air compressor according to claim 1, wherein an air volume generated by the outer blade is larger than an air volume enabled to flow along an inner side of the partition part by the inner blade.

11. The air compressor according to claim 1, wherein the partition part has a cylindrical shape extending in the direction along the rotational shaft of the motor.

12. An air compressor comprising:
    an air tank configured to store therein compressed air;
    a compression part configured to compress air sucked from an outside and to direct the air to the air tank;
    a motor configured to drive the compression part;
    a cooling fan provided at one end-side of a rotational shaft of the motor and in the vicinity of the motor; and
    a cover configured to cover at least the compression part and the motor,
    wherein the cooling fan includes:
      an outer blade configured to direct an air stream to the compression part;
      an inner blade configured to direct an air stream to flow in a direction along a rotational shaft of the cooling fan at an inner side of the outer blade; and
      a partition part interposed between the outer blade and the inner blade, and
    wherein at an inner side of the partition part, the cooling fan further includes a motor-side opening and a non-motor-side opening, and
    wherein an opening area of the motor-side opening and an opening area of the non-motor-side opening are different.

* * * * *